US011149821B2

(12) United States Patent
Chen et al.

(10) Patent No.: US 11,149,821 B2
(45) Date of Patent: Oct. 19, 2021

(54) LINE GEAR MECHANISM WITH VARIABLE-ANGLE TRANSMISSION (71) Applicant: SOUTH CHINA UNIVERSITY OF TECHNOLOGY, Guangdong (CN)

(72) Inventors: Yangzhi Chen, Guangdong (CN); Chao He, Guangdong (CN); Yueling Lv, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 25 days.

(21) Appl. No.: 16/652,418

(22) PCT Filed: Oct. 31, 2018

(86) PCT No.: PCT/CN2018/113219
§ 371 (c)(1),
(2) Date: Mar. 31, 2020

(87) PCT Pub. No.: WO2019/114452
PCT Pub. Date: Jun. 20, 2019

(65) Prior Publication Data
US 2020/0284321 A1 Sep. 10, 2020

(30) Foreign Application Priority Data

Dec. 15, 2017 (CN) .......................... 201711349253.X (51) Int. Cl.
*F16H 1/12* (2006.01)
*F16H 35/16* (2006.01)
*F16H 55/22* (2006.01)

(52) U.S. Cl.
CPC ............. *F16H 1/125* (2013.01); *F16H 35/16* (2013.01); *F16H 55/22* (2013.01)

(58) Field of Classification Search
CPC ........... F16H 1/125; F16H 35/16; F16H 55/22
See application file for complete search history.

(56) References Cited

U.S. PATENT DOCUMENTS 2,673,401 A * 3/1954 Bradner .................. F16H 35/16
33/501.17
3,386,305 A * 6/1968 Wildhaber ................ F16H 1/16
74/425

(Continued)

FOREIGN PATENT DOCUMENTS

CN 101782129 7/2010
CN 102954153 3/2013
(Continued)

OTHER PUBLICATIONS

"International Search Report (Form PCT/ISA/210) of PCT/CN2018/113219", dated Jan. 22, 2019, with English translation thereof, pp. 1-5.

*Primary Examiner* — Terence Boes
(74) *Attorney, Agent, or Firm* — JCIPRNET (57) ABSTRACT The present invention relates to a line gear mechanism with variable-angle transmission, which consists of a line gear pair having intersecting shafts which includes a driving line gear and a driven line gear. The driving line gear and the driven line gear are each composed of a wheel body and a line tooth. Contact curves of the driving line gear and the driven line gear mesh according to a pair of space conjugate curves. One or more line teeth are provided on the driving line gear. The line tooth on the driven line gear is a line tooth that has a property of variable-angle transmission. During transmission, the mechanism may adjust a transmission angle of the line gear pair having the intersecting shafts, thus causing meshing points to form on different contact curves while a transmission ratio remains unchanged and the transmission is stable.

6 Claims, 3 Drawing Sheets (56) References Cited

U.S. PATENT DOCUMENTS

| | | | |
|---|---|---|---|
| 5,092,751 A | 3/1992 | Viktora | |
| 2006/0005653 A1* | 1/2006 | Fleytman | F16H 1/06 |
| | | | 74/425 |
| 2010/0212444 A1* | 8/2010 | Smith | F16H 55/22 |
| | | | 74/425 |

FOREIGN PATENT DOCUMENTS

| | | | |
|---|---|---|---|
| CN | 105114532 | 12/2015 | |
| CN | 205978280 | 2/2017 | |
| CN | 108019463 | 5/2018 | |
| CN | 207830466 | 9/2018 | |
| EP | 3282145 A1 * | 2/2018 | ............ B23F 17/001 |
| WO | 2013067039 | 5/2013 | |

\* cited by examiner

LINE GEAR MECHANISM WITH VARIABLE-ANGLE TRANSMISSION

CROSS-REFERENCE TO RELATED APPLICATION

This application is a 371 of international application of PCT application serial no. PCT/CN2018/113219, filed on Oct. 31, 2018, which claims the priority benefit of China application no. 201711349253.X, filed on Dec. 15, 2017. The entirety of each of the above mentioned patent applications is hereby incorporated by reference herein and made a part of this specification.

TECHNICAL FIELD

The present invention relates to the field of mechanical transmission, and more particularly, to a line gear mechanism with variable-angle transmission that meshes based on space conjugate curves.

BACKGROUND

A gear capable of realizing variable-angle transmission in accelerating or decelerating transmission between two shafts is called a gear with variable-angle transmission. A gear mechanism with variable-angle transmission is mainly used in transmission occasions with special requirements, such as a directionally adaptive generator, a variable angle shaver, direction control of submersible, etc.

A mechanism used for variable-angle transmission mainly includes a coupler and a flexible shaft currently. A function of variable-angle transmission between two shafts can be realized by the coupler; and shafts connected to both ends of a universal coupler can obtain variable-angle transmission. Variable-angle transmission of the flexible shaft is determined by a material of the shaft, the material of the shaft is flexible and easy to twist, and after the flexible shaft is twisted, a transmission angle of the flexible shaft is changed.

Line gear is a new gear based on space curve meshing theory instead of the traditional space curved surface meshing theory, is mainly used in the field of micro transmission, and has advantages of a small size, a large transmission ratio and convenient manufacturing, etc. Line gear can be used for transmission on vertical shafts, intersecting shafts and staggered shafts currently, and the design equation, contact ratio, the strength criterion, the micro-transmission, the manufacturing field and other researches on line gear have been perfected.

In a micro mechanical device with a limited dimension, there is sometimes a transmission requirement to change a transmission angle, and the transmission requirement is difficult to be met by controlling. Moreover, the traditional coupler is not suitable for a micro dimension and the flexible shaft lacks a certain reliability.

SUMMARY

The present invention provides a design scheme of a line gear pair with stable variable-angle transmission based on a line gear theory, and a line gear pair mechanism designed by this method can provide stable variable-angle transmission.

The technical solutions used in the present invention are as follows.

A line gear mechanism with variable-angle transmission consists of a line gear pair having intersecting shafts which includes a driving line gear and a driven line gear. The driving line gear and the driven line gear are each composed of a wheel body and a line tooth. Contact curves of the driving line gear and the driven line gear mesh according to a pair of space conjugate curves. One or more line teeth are provided on the driving line gear. The line tooth on the driven line gear is a line tooth that has a property of with variable-angle transmission. During transmission, the mechanism can adjust a transmission angle of the line gear pair having the intersecting shafts, thus causing meshing points to form on different contact curves while a transmission ratio remains unchanged and the transmission is stable.

Preferably, in the contact curves or contact surfaces of the driving line gear and the driven line gear, there is a driving contact curve or a curved surface composed of a series of driving contact curves forming a working surface on the line tooth of the driving line gear; and there is a corresponding series of driven contact curves forming a working surface on the line tooth of the driven line gear or a driven contact curve.

Preferably, the line tooth of the driving line gear meshes with the line tooth of the driven line gear by point contact, so that continuous point contact transmission can be realized. At different transmission angles, the driving contact curve is the same contact curve, while the driven contact curves are different contact curves. That is, transmission is realized by a corresponding pair of different conjugate contact curves at different transmission angles.

Preferably, the driving contact curve for meshing on the line tooth of the driving line gear is simplified as a cylindrical spiral line. A working surface composed of a series of conical spiral lines is provided on the line tooth of the driven line gear, each transmission angle corresponds to one driven contact curve for meshing on the line tooth of the driven line gear, and the driven contact curve is changed when the transmission angle is changed.

Preferably, an equation of a curved surface composed of the driving contact curve and the driven contact curve is determined as follows:

O–xyz is set as a Cartesian coordinate system that is arbitrarily fixed in space, O is an origin of the coordinate system O–xyz, x, y and z are three coordinate axes of the coordinate system O–xyz, a Cartesian coordinate system $O_p$–$x_py_pz_p$ is determined according to a position of the coordinate system O–xyz, a plane $x_pO_pz_p$ and a plane xOz are located in the same plane, a is a distance from a coordinate origin $O_p$ to the z axis, b is a distance from the $O_p$ to the x axis, $(\pi-\theta)$ is an included angle between the z axis and a $z_p$ axis, $\theta$ is an included angle between angular velocity vectors of the driving and driven line gears, with $0° \leq \theta \leq 180°$, coordinate systems $O_1$–$x_1y_1z_1$ and $O_2$–$x_2y_2z_2$ are respectively coordinate systems fixed on the driving line gear and the driven line gear, the driving line gear and the driven line gear respectively rotate about the z axis and the $z_p$ axis during transmission, when the driving line gear and the driven line gear are at an initial meshing point, the coordinate systems $O_1$–$x_1y_1z_1$ and $O_2$–$x_2y_2z_2$ respectively coincide with the coordinate systems O–xyz and $O_p$–$x_py_pz_p$ at any moment, an origin $O_1$ coincides with the origin O, a $z_1$ axis coincides with the z axis, an origin $O_2$ coincides with the origin $O_p$, a $z_2$ axis coincides with the $z_p$ axis, the driving line gear rotates about the z axis at a constant angular velocity $\omega_1$, an angular velocity direction of the driving line gear is a negative direction of the z axis, and $\varphi_1$ is an angle that the driving line gear rotates through about the z axis; the driven line gear rotates about the $z_p$ axis at a constant angular velocity $\omega_2$, an angular velocity direction of the driven line gear is a negative direction of the $z_p$ axis, and $\varphi_2$ is an angle that the driven line gear rotates through about the $z_p$ axis, and then an equation of the driving contact curve in the coordinate system $O_1-x_1y_1z_1$ is:

$$\begin{cases} x_M^{(1)} = m\cos t \\ y_M^{(1)} = m\sin t \\ z_M^{(1)} = n\pi + nt \end{cases}$$

$$\left(-\pi \leq t \leq -\frac{\pi}{2}\right)$$

in addition, an equation of a curved surface composed of the driven contact curves is determined as follows:

1) an equation of a contact curve of a driven line gear transmitting at a given angle $\theta$ is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta \end{cases}$$

2) for a line gear pair with variable-angle transmission, a transmission angle parameter is additionally provided, and at this moment, a working surface is formed by continuously changed driven contact curves, and an equation of a curved surface of a working surface of the driven line gear with variable-angle transmission is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta + h \\ \theta = \pi * t_1 \end{cases}$$

3) considering an influence of a pressure angle during the transmission process, a parameter capable of improving the pressure angle is additionally provided; and at this moment, the equation of the curved surface of the working surface of the driven line gear with variable-angle transmission is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta + h \\ \theta = \pi * t_1 \\ h = c * t_1 \end{cases}$$

wherein t is a parametric variable, $t_1$ is a variable angle parameter, and h is a curved surface parameter of a driven contact surface. After introduction of h, a meshing state of a driving contact curve and a driven contact curve is unchanged, which can be understood as movement of an initial meshing point on the driving and driven contact curves. The equation of the driving contact curve and an equation of a working surface of the driven contact curve after the transmission angle is changed are:

$$\begin{cases} x_M^{(1)} = m\cos t \\ y_M^{(1)} = m\sin t \\ z_M^{(1)} = n\pi + nt + h \end{cases}$$

$$\left(-\pi \leq t \leq -\frac{\pi}{2}\right)$$

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta + h \\ \theta = \pi * t_1 \\ h = c * t_1 \end{cases}$$

Actually, the equation of the driving contact curve mentioned above is obtained after the driving contact curve rotates at a certain angle, which means that the driving contact curve is actually the same curve.

$$\begin{cases} x_M^{(1)} = m\cos t \\ y_M^{(1)} = m\sin t \\ z_M^{(1)} = n\pi + nt \end{cases}$$

$$\left(-\pi - \frac{h}{n} \leq t \leq -\frac{\pi}{2} - \frac{h}{n}\right)$$

Preferably, the equation of the driving contact curve and an equation of a curved surface of a working surface composed of the driven contact curves are determined as follows:

the equation of the driving contact curve is:

$$\begin{cases} x_M^{(1)} = m\cos t \\ y_M^{(1)} = m\sin t \\ z_M^{(1)} = n\pi + nt \end{cases}$$

the equation of the curved surface of the working surface composed of the driven contact curves is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta + h \\ \varphi_2 = i\varphi_1 \\ \varphi_1 = t + \pi \\ \theta = \pi * t_1 \\ h = c * t_1 \end{cases}$$

wherein t is a parametric variable, $t_1$ is a variable angle parameter, i is a transmission ratio, $\theta$ is a transmission angle, and h is a curved surface parameter of a driven contact surface.

Compared with the prior art, the present invention has the following advantages.

1. Variable-angle transmission in a certain range can be provided in a line gear pair, all transmission angles can be transited stably, and the transmission is also stable after the transmission angle is changed.

2. The transmission only depends on the point contact between the line tooth of the driving line gear and the line tooth of the driven line gear. Therefore, only an accuracy of the contact curve needs to be ensured. The line gear mechanism is simple in design, convenient in processing, smaller in mass and volume than the traditional gear with a variable transmission ratio, and suitable for micro electromechanical products.

3. A minimum tooth number of the driving line gear is 1, transmission with a larger transmission ratio can be provided, and the line gear pair can be designed under the condition of intersecting shafts and any transmission ratio.

DETAILED DESCRIPTION

The objective of the present invention is further described in detail hereinafter with reference to the drawings and the specific embodiments, the embodiments cannot be enumerated one by one here, but the implementation of the present invention are not limited to the following embodiments.

Figure 2:
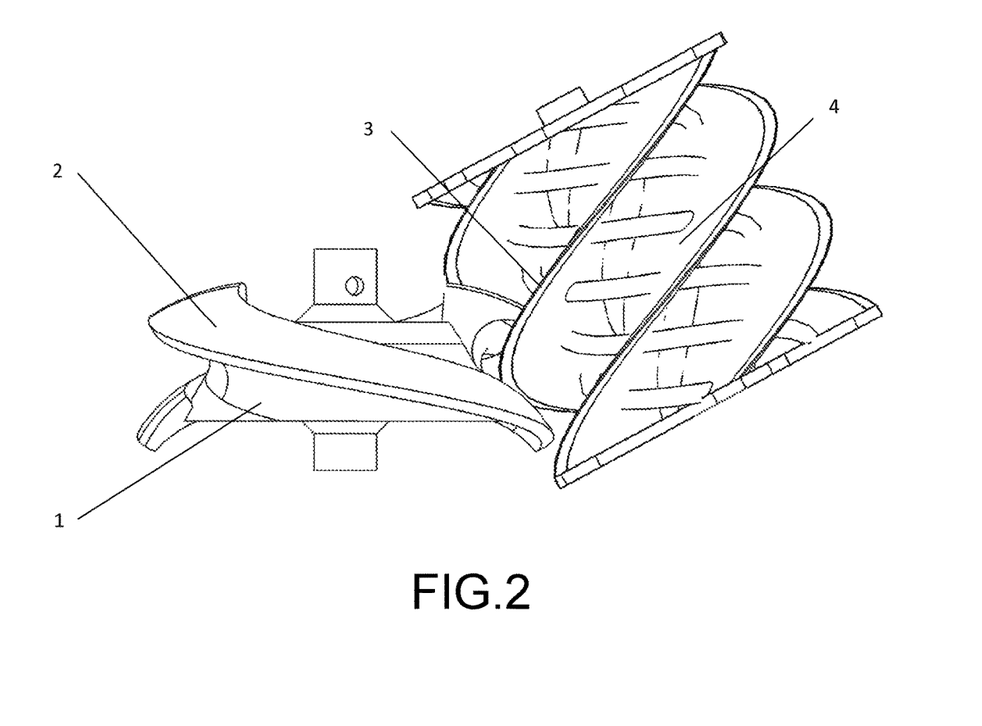
FIG. 2 is a meshing diagram of one embodiment of the present invention, including a driving line gear and a driven line gear.
Figure 3:
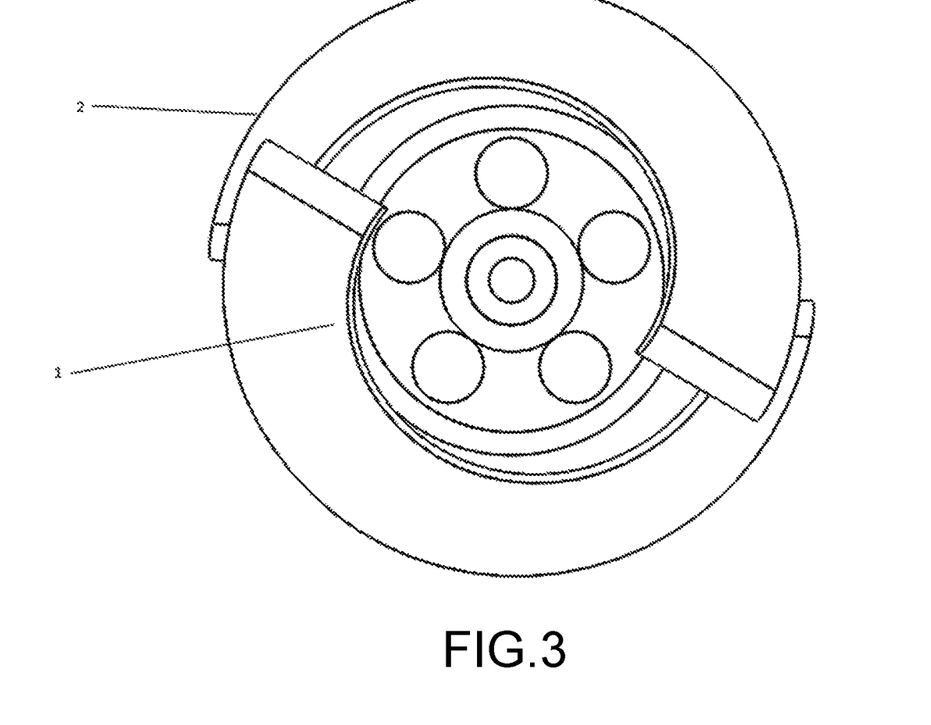
FIG. 3 is an embodiment of the driven line gear according to an embodiment of the present invention.

As shown in FIG. 2 and FIG. 3, a line gear mechanism with variable-angle transmission which forms a transmission pair consisting of a line gear pair having intersecting shafts which includes a driving line gear 3 and a driven line gear 1. The driving line gear 3 and the driven line gear 1 are each composed of a wheel body and a line tooth. Contact curves of the line tooth 4 of the driving line gear and the line tooth 2 of the driven line gear mesh according to a pair of space conjugate curves. One or more line teeth are provided on the driving line gear. The line tooth on the driven line gear is a line tooth that has a property of variable-angle transmission. During transmission, the mechanism can adjust a transmission angle of the line gear pair having the intersecting shafts, thus causing meshing points to form on different contact curves while a transmission ratio remains unchanged and transmission is stable.

In the contact curves or contact surfaces of the line tooth 4 of the driving line gear and the line tooth 2 of the driven line gear, a working surface on the line tooth 4 of the driving line gear is a driving contact curve or a curved surface composed of a series of driving contact curves; and a working surface on the line tooth 2 of the driven line gear is composed of a series of driven contact curves.

The line tooth 4 of the driving line gear meshes with the line tooth 2 of the driven line gear by point contact, so that continuous point contact transmission can be realized. At different transmission angles, the driving contact curve is the same contact curve, while the driven contact curves are different contact curves. That is, transmission is realized by a corresponding pair of different conjugate contact curves at different transmission angles.

As shown in FIG. 3, the driving contact curve for meshing on the line tooth 4 of the driving line gear is simplified as a cylindrical spiral line. There is a series of conical spiral lines is provided on the line tooth 2 of the driven line gear forming a working surface of the driven line gear, each transmission angle corresponds to one driven contact curve for meshing on the line tooth 2 of the driven line gear, and the driven contact curve of the line tooth 2 of the driven line gear is changed when the transmission angle is changed.

An equation of a curved surface composed of the driving contact curve and the driven contact curve is determined as follows.

Figure 1:
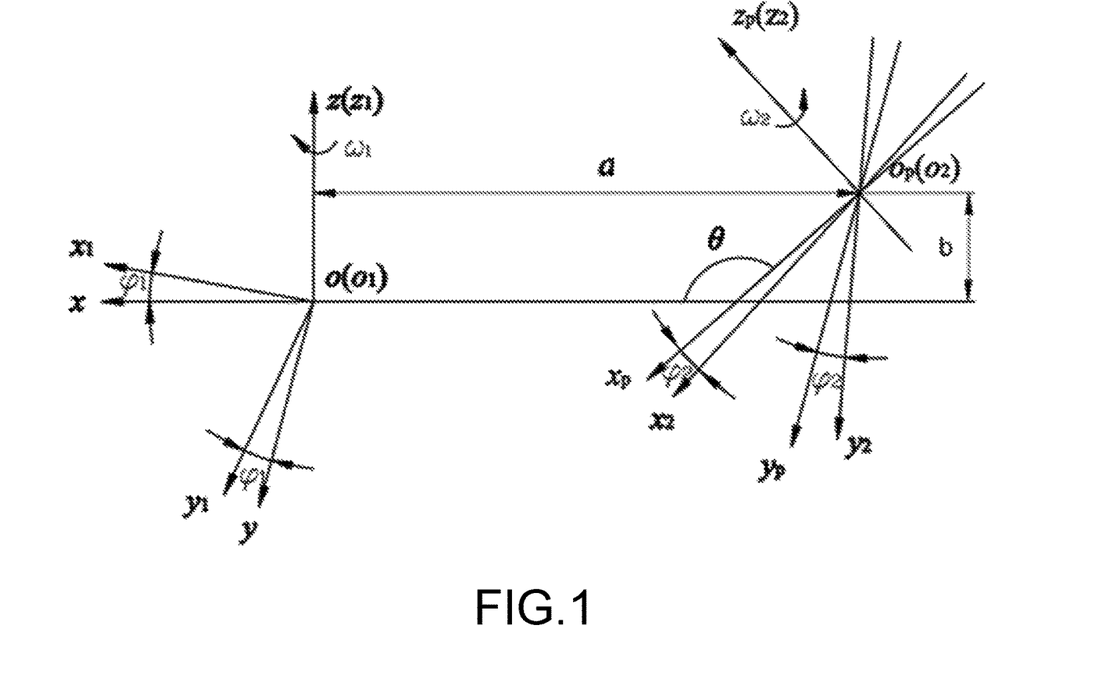
FIG. 1 is a coordinate system of a mechanism according to the present invention.

As shown in FIG. 1, O-xyz is set as a Cartesian coordinate system that is arbitrarily fixed in space, O is an origin of the coordinate system O-xyz, x, y and z are three coordinate axes of the coordinate system O-xyz, a Cartesian coordinate system $O_p-x_py_pz_p$ is determined according to a position of the coordinate system O-xyz, a plane $x_pO_pz_p$, and a plane xOz are located in the same plane, a is a distance from a coordinate origin $O_p$ to the z axis, b is a distance from the $O_p$ to the x axis, $(\pi-\theta)$ is an included angle between the z axis and a $z_p$ axis, $\theta$ is an included angle between angular velocity vectors of the driving and driven line gears, with $0°\le\theta\le180°$, coordinate systems $O_1-x_1y_1z_1$ and $O_2-x_2y_2z_2$ are respectively coordinate systems fixed on the driving line gear and the driven line gear, the driving line gear and the driven line gear respectively rotate about the z axis and the $z_p$ axis during transmission, when the driving line gear and the driven line gear are at an initial meshing point, the coordinate systems $O_1-x_1y_1z_1$ and $O_2-x_2y_2z_2$ respectively coincide with the coordinate systems O-xyz and $O_p-x_py_pz_p$, at any moment, an origin $O_1$ coincides with the origin O, a $z_1$ axis coincides with the z axis, an origin $O_2$ coincides with the origin $O_p$, a $z_2$ axis coincides with the $z_p$ axis, the driving line gear rotates about the z axis at a constant angular velocity $\omega_1$, an angular velocity direction of the driving line gear is a negative direction of the z axis, and $\varphi_1$ is an angle that the driving line gear rotates through about the z axis; the driven line gear rotates about the $z_p$ axis at a constant angular velocity $\omega_2$, an angular velocity direction of the driven line gear is a negative direction of the $z_p$ axis, and $\varphi_2$ is an angle that the driven line gear rotates through about the $z_p$ axis, and the line tooth 4 of the driving line gear is determined by an equation of a contact curve of the line tooth 4 of the driving line gear, then an equation of the driving contact curve in the coordinate system $O_1-x_1y_1z_1$ is:

$$\begin{cases} x_M^{(1)} = m\cos t \\ y_M^{(1)} = m\sin t \\ z_M^{(1)} = n\pi + nt \end{cases} \left(-\pi \le t \le -\frac{\pi}{2}\right). \quad (1)$$

In addition, an equation of a curved surface composed of the driven contact curves is determined as follows:

the line tooth of the driven line gear is determined by an equation of a contact curve of the line tooth of the driven line gear, the contact curve is calculated by the contact curve of the line tooth of the driving line gear and a spatial curve meshing theory, and the equation of the contact curve in $O_2-x_2y_2z_2$ is that:

when a transmission ratio is i, an equation of a contact curve of a driven line gear transmitting at a certain angle θ is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta \end{cases} \quad (2)$$

For a line gear pair with variable-angle transmission, a transmission angle parameter is additionally provided. At this moment, a working surface is formed by continuously changed driven contact curves. When the transmission angle is changed, an equation of a contact curve on the line tooth with variable-angle transmission is changed, and at this moment, an equation of a curved surface of a working surface of the driven line gear 2 with variable-angle transmission is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta \\ \theta = \pi * t_1 \end{cases} \quad (3)$$

wherein $t_1$ is a variable-angle transmission parameter.

Considering non-uniqueness of a curved surface parameter of a curved surface of driven curve and an influence of a pressure angle during transmission, a parameter capable of improving the pressure angle is additionally provided. At this moment, the equation of the curved surface of the working surface of the driven line gear 2 with variable-angle transmission is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta + h \\ \varphi_2 = i\varphi_1 \\ \varphi_1 = t + \pi \\ \theta = \pi * t_1 \\ h = c * t_1 \end{cases} \quad (4)$$

wherein t is a parametric variable, $t_1$ is a variable angle parameter, i is a transmission ratio, θ is a transmission angle, and h is a curved surface parameter of a driven contact surface.

When two space curves mesh, the two space curves meet an equation:

$$v_{12} \cdot \beta = 0 \quad (5)$$

wherein $v_{12}$ represents a relative movement speed of a space conjugate curve at a contact point, and β represents a principal normal vector of a driving contact curve at a contact point.

A meshing equation of the driving contact curve and the driven contact curve is:

$$\begin{cases} x_M^{(2)} = (-\cos\varphi_1\cos\varphi_2\cos\theta - \sin\varphi_1\sin\varphi_2)x_M^{(1)} + \\ \quad (-\sin\varphi_1\cos\varphi_2\cos\theta + \cos\varphi_1\sin\varphi_2)y_M^{(1)} - \\ \quad \cos\varphi_2\sin\theta z_M^{(1)} + (-a\cos\varphi_2\cos\theta + b\cos\varphi_2\sin\theta) \\ y_m^{(2)} = (\cos\varphi_1\sin\varphi_2\cos\theta - \sin\varphi_1\cos\varphi_2)x_M^{(1)} + \\ \quad (\sin\varphi_1\sin\varphi_2\cos\theta + \cos\varphi_1\cos\varphi_2)y_M^{(1)} + \\ \quad \sin\varphi_2\sin\theta z_M^{(1)} + (a\sin\varphi_2\cos\theta - b\sin\varphi_2\sin\theta) \\ z_M^{(2)} = \cos\varphi_1\sin\theta x_M^{(1)} + \sin\varphi_1\sin\theta y_M^{(1)} - \cos\theta z_M^{(1)} + \\ \quad (a\sin\theta + b\cos\theta) \end{cases} \quad (6)$$

wherein physical meanings of all parameters are as follows:

m is a radius of spin of the driving contact curve;

n is a parameter of the driving contact curve related to a pitch, and if the pitch is p, then $$n = \frac{p}{2\pi}$$

is defined;

t is a parametric variable, and $$-\pi \le t \le -\frac{\pi}{2}$$

represents that a contact curve of a line tooth of the driving line gear is a spiral line of ¼ circumference; when t=−π, the line tooth of the driving line gear and the line tooth of the driven line gear start to mesh; and when $$t = -\frac{\pi}{2},$$

the driving line gear rotates by ¼ circumference, and the line tooth of the driving line gear meshes with the line tooth of the driven line gear to a tail end and then start to separate;

$t_1$ is a curved surface parametric variable of a driven line tooth;

h is a curved surface improvement parameter of the driven line tooth;

a and b are position parameters of the driving line gear and the driven line gear, as shown in FIG. 1;

θ is an angle parameter of the driving line gear and the driven line gear, as shown in FIG. 1;

i is two transmission ratios required;

$\varphi_1$ is an angle that the driving line gear rotates through;

$\varphi_2$ is an angle that the driven line gear rotates through; and $\varphi_a$ and $\varphi_b$ are starting and ending angles of a certain line tooth of the driving line gear during transmission when the transmission ratio is changed, for example, when $$-\pi < t < -\frac{\pi}{2},$$
$$\varphi_b - \varphi_a = \frac{\pi}{2}.$$

Figure 4:
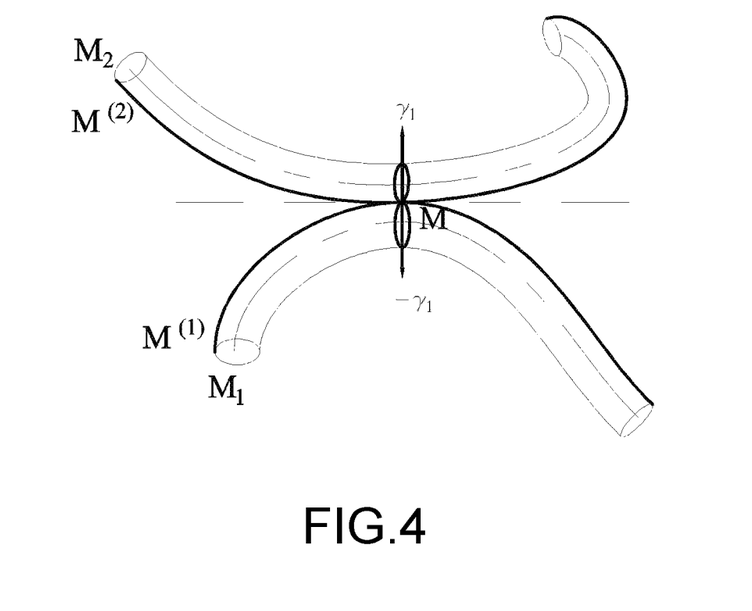
FIG. 4 is a method for generating a line tooth entity according to an embodiment of the present invention.
Figure 5:
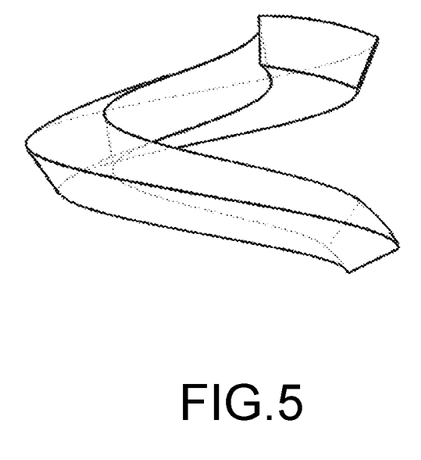
FIG. 5 is a method for establishing a driven line tooth entity according to an embodiment of the present invention.

A line tooth entity can be established according to the equations (1) to (4). The line tooth entity only needs to be able to meet a strength requirement, and the line tooth entity itself does not have any specific shape requirement. As shown in FIG. 4, a certain volume extends outwardly from one side in a contact direction of the line tooth of the driving line gear and the line tooth of the driven line gear respectively at each meshing point, and then the required line tooth can be generated. For the driven line tooth, a fitted curved surface can be established in curved surface modeling software such as UG, and an entitative line tooth model is generated on one side by using a thickening feature, as shown in FIG. 5. The wheel body is used for fixedly connecting the line teeth.

For the line gear mechanism with variable-angle transmission mentioned above, a structure of the line tooth of the driven line gear enables a transmission angle of the line gear pair to change steplessly from a minimum transmission angle to a maximum transmission angle in the transmission process.

The line tooth 4 of the driving line gear of the mechanism is designed based on a cylindrical spiral line and may include one or more line teeth. The line tooth 4 of the driving line gear meshes with the line teeth 2 of the driven line gear by point contact. The driven line gear 1 is connected to an output end to provide motion or force output. The line tooth on the driven line gear 1 has various designs, and according to different equations of the contact curve on the line gear, a line tooth that has a property of variable-angle transmission can be designed. The transmission angle can be changed at any time according to requirements, and different transmission angles may exist at the same transmission ratio.

The principle of the present invention is that: according to a space conjugate curve meshing theory of the line gear, the equation of the contact curve of the line tooth of the driven line gear required for variable-angle transmission can be designed. The equation of the contact curve of the line tooth of the driven line gear is improved, so that when the line teeth mesh stably, the transmission angle is a certain value, and when the transmission angle needs to be changed, the transmission angle becomes another value. The transmission during this period is changed stably, and the transmission is also stable after the change, thus obtaining the equation of the curved surface of the contact curve of the line tooth of the driven line gear required for variable-angle transmission.

The above embodiments of the present invention are merely examples made for clearly illustrating the present invention, but are not used for limiting the implementations of the present invention. Those of ordinary skills in the art can make other different forms of changes or alterations on the basis of the description above. It is not necessary and impossible to exhaust all the implementations here. All the modifications, equivalents, and improvements made within the spirit and principle of the present invention shall fall within the scope of protection of the claims of the present invention.

What is claimed is:

1. A line gear mechanism with variable-angle transmission, wherein the mechanism consists of a line gear pair having intersecting shafts which comprises a driving line gear and a driven line gear, the driving line gear and the driven line gear are each composed of a wheel body and a line tooth, contact curves of the driving line gear and the driven line gear mesh according to a pair of space conjugate curves, one or more line teeth are provided on the driving line gear, the line tooth on the driven line gear is a line tooth that has a property of variable-angle transmission, and during transmission, the mechanism can adjust a transmission angle of the line gear pair having the intersecting shafts, causing meshing points to form on different contact curves while a transmission ratio remains unchanged and the transmission is stable.

2. The line gear mechanism with variable-angle transmission according to claim 1, wherein in the contact curves or contact surfaces of the driving line gear and the driven line gear, there is a driving contact curve or a curved surface composed of a series of driving contact curves forming a working surface on the line tooth of the driving line gear; and there is a corresponding series of driven contact curves forming the working surface on the line tooth of the driven line gear or a driven contact curve.

3. The line gear mechanism with variable-angle transmission according to claim 2, wherein the line tooth of the driving line gear meshes with the line tooth of the driven line gear by point contact, so that continuous point contact transmission can be realized; and at different transmission angles, the driving contact curve is the same contact curve, while the driven contact curves are different contact curves, which means that transmission is realized by a corresponding pair of different conjugate contact curves at different transmission angles.

4. The line gear mechanism with variable-angle transmission according to claim 3, wherein the driving contact curve for meshing on the line tooth of the driving line gear is simplified as a cylindrical spiral line; and a working surface composed of a series of conical spiral lines is provided on the line tooth of the driven line gear, each transmission angle corresponds to one driven contact curve for meshing on the line tooth of the driven line gear, and the driven contact curve is changed when the transmission angle is changed.

5. The line gear mechanism with variable-angle transmission according to claim 4, wherein an equation of a curved surface composed of the driving contact curve and the driven contact curve is determined as follows:

O–xyz is set as a Cartesian coordinate system that is arbitrarily fixed in space, O is an origin of the coordinate system O–$_{xyz}$, x, y and z are three coordinate axes of the coordinate system O–xyz, a Cartesian coordinate system $O_p$–$x_p y_p z_p$ is determined according to a position of the coordinate system O–xyz, a plane $x_p O_p z_p$ and a plane xOz are located in the same plane, a is a distance from a coordinate origin $O_p$ to the z axis, b is a distance from the $O_p$ to the x axis, ($\pi$–$\theta$) is an included angle between the z axis and a $z_p$ axis, $\theta$ is an included angle between angular velocity vectors of the driving and driven line gears, with 0°≤$\theta$≤180°, coordinate systems $O_1$–$x_1 y_1 z_1$ and $O_2$–$x_2 y_2 z_2$ are respectively coordinate systems fixed on the driving line gear and the driven line gear, the driving line gear and the driven line gear respectively rotate about the z axis and the $z_p$ axis during transmission, when the driving line gear and the driven line gear are at an initial meshing point, the coordinate systems $O_1$–$x_1 y_1 z_1$ and $O_2$–$x_2 y_2 z_2$ respectively coincide with the coordinate systems O–xyz and $O_p$–$x_p y_p z_p$, at any moment, an origin $O_1$ coincides with the origin O, a $z_1$ axis coincides with the z axis, an origin $O_2$ coincides with the origin $O_p$, a $z_2$ axis coincides with the $z_p$ axis, the driving line gear rotates about the z axis at a constant angular velocity $\omega_1$, an angular velocity direction of the driving line gear is a negative direction of the z axis, and $\omega_1$ is an angle that the driving line gear rotates through about the z axis; the driven line gear rotates about the $z_p$ axis at a constant angular velocity $\omega_2$, an angular velocity direction of the driven line gear is a negative direction of the $z_p$ axis, and $\varphi_2$ is an angle that the driven line gear rotates through about the $z_p$ axis, and then an equation of the driving contact curve in the coordinate system $O_1-x_1y_1z_1$ is:

$$\begin{cases} x_M^{(1)} = m\cos t \\ y_M^{(1)} = m\sin t \quad \left(-\pi \le t \le -\dfrac{\pi}{2}\right) \\ z_M^{(1)} = n\pi + nt \end{cases}$$

in addition, an equation of a curved surface composed of the driven contact curves is determined as follows:

1) an equation of a contact curve of a driven line gear transmitting at a given angle $\theta$ is:

$$\begin{cases} x_M^{(2)} = [(m-a)\cos\theta - (n\pi+nt-b)\sin\theta]\cos\varphi_2 \\ y_M^{(2)} = -[(m-a)\cos\theta - (n\pi+nt-b)\sin\theta]\sin\varphi_2 \\ z_M^{(2)} = -(m-a)\sin\theta - (n\pi+nt-b)\cos\theta \end{cases}$$

2) for a line gear pair with variable-angle transmission, a transmission angle parameter is additionally provided, and at this moment, a working surface is formed by continuously changed driven contact curves, and an equation of a curved surface of a working surface of the driven line gear with variable-angle transmission is:

$$\begin{cases} x_M^{(2)} = [(m-a)\cos\theta - (n\pi+nt-b)\sin\theta]\cos\varphi_2 \\ y_M^{(2)} = -[(m-a)\cos\theta - (n\pi+nt-b)\sin\theta]\sin\varphi_2 \\ z_M^{(2)} = -(m-a)\sin\theta - (n\pi+nt-b)\cos\theta \\ \theta = \pi*t_1 \end{cases}$$

3) considering an influence of a pressure angle during transmission, a parameter capable of improving the pressure angle is additionally provided; and at this moment, the equation of the curved surface of the working surface of the driven line gear with variable-angle transmission is:

$$\begin{cases} x_M^{(2)} = [(m-a)\cos\theta - (n\pi+nt-b)\sin\theta]\cos\varphi_2 \\ y_M^{(2)} = -[(m-a)\cos\theta - (n\pi+nt-b)\sin\theta]\sin\varphi_2 \\ z_M^{(2)} = -(m-a)\sin\theta - (n\pi+nt-b)\cos\theta + h \\ \theta = \pi*t_1 \\ h = c*t_1 \end{cases}$$

wherein t is a parametric variable, $t_1$ is a variable angle parameter, $\theta$ is a transmission angle, and h is a curved surface parameter of a driven contact surface.

6. The line gear mechanism with variable-angle transmission according to claim 5, wherein the equation of the driving contact curve and an equation of a curved surface of a working surface composed of the driven contact curves are determined as follows:

the equation of the driving contact curve is:

$$\begin{cases} x_M^{(1)} = m\cos t \\ y_M^{(1)} = m\sin t \\ z_M^{(1)} = n\pi + nt \end{cases}$$

the equation of the curved surface of the working surface composed of the driven contact curves is:

$$\begin{cases} x_M^{(2)} = [(m-a)\cos\theta - (n\pi+nt-b)\sin\theta]\cos\varphi_2 \\ y_M^{(2)} = -[(m-a)\cos\theta - (n\pi+nt-b)\sin\theta]\sin\varphi_2 \\ z_M^{(2)} = -(m-a)\sin\theta - (n\pi+nt-b)\cos\theta + h \\ \varphi_2 = i\varphi_1 \\ \varphi_1 = t + \pi \\ \theta = \pi*t_1 \\ h = c*t_1 \end{cases}$$

wherein t is a parametric variable, $t_1$ is a variable angle parameter, i is a transmission ratio, $\theta$ is a transmission angle, and h is a curved surface parameter of a driven contact surface.

* * * * *